Nov. 9, 1937.    D. T. MAY    2,098,300

ELECTRIC WELDING

Filed Aug. 8, 1935

INVENTOR
D. T. MAY
BY
ATTORNEY

Patented Nov. 9, 1937

2,098,300

UNITED STATES PATENT OFFICE 2,098,300

ELECTRIC WELDING

David T. May, Port Washington, N. Y., assignor to Bell Telephone Laboratories, Incorporated, New York, N. Y., a corporation of New York Application August 8, 1935, Serial No. 35,234

5 Claims. (Cl. 148—6)

This invention relates to the art of electric welding and its object is to secure improved methods therein.

It has been recognized heretofore that welding currents of high intensity are required where that portion of the circuit lying in the immediate neighborhood of the welding action offers a low resistance to the flow of said currents. And it has been proposed to increase the resistance offered to the current flow either by providing the stock with rough surfaces to reduce the contact area or by adding a layer of some resistance material.

Applicant has found it particularly important to control the intensity of the heating current where certain highly conductive metals, such as silver, are being welded to metals of different character, such as copper, brass, and bronze. Because of the different melting points of the different metals care must be exercised not to overheat the one having the lower melting point. In the case of brass, for example, an excessive heating current is liable to distill out one of the component metals of the alloy. Again where precious metal, such as silver, is welded to the surfaces of base metal parts, it is of course desirable to conserve the precious metal as much as possible by applying it in thin layers to the base metal parts. For instance, where the brass terminals of automatic selector switches are to be covered with silver to improve their electrical characteristics, it is sufficient to apply a thin layer, and for this purpose silver foil as thin possibly as a thousandth of an inch may be used. It is, therefore, more important under such circumstances than in the usual welding operation that the relative resistances of the different parts of the circuit through which the welding current flows be so controlled that the heat resulting from this current is concentrated in the region where the weld is to occur. Moreover, the methods heretofore proposed for controlling the resistance of the circuit, such as roughening the surface of the material, are not suitable in view of the thinness of the material.

According to the present invention the problems above mentioned are met and advantages are secured over welding methods heretofore used by an improved method in which the metal stock is prepared for the welding operation by artificially producing a tarnish on the surface of said stock to increase the resistance to the flow of the welding current. When the stock thus prepared is placed between the electrodes in contact with the metallic surface to which it is to be welded and current is applied, the greatly increased resistance at the tarnished surface results in a greater amount of heat being produced in the region of the weld for a given current value.

Another feature of the invention is a method in which one side of the metal stock is protected with a coating of wax or other suitable material to confine the tarnishing operation to the unprotected surfaces.

These and other advantages of the invention will be described more fully in detail in the following specification and will also be set forth in the appended claims.

For the purpose of explaining the invention it will be assumed that the welding stock which is to be prepared for the welding process is in the form of a thin ribbon or foil of some highly conductive metal such as silver, gold, platinum, palladium. And while the invention is of particular value in such a case it is not limited to the preparation of welding stock of any particular shape or thickness, and it may of course be employed to advantage with metals having lower conductivities than those above mentioned.

Figure 1:
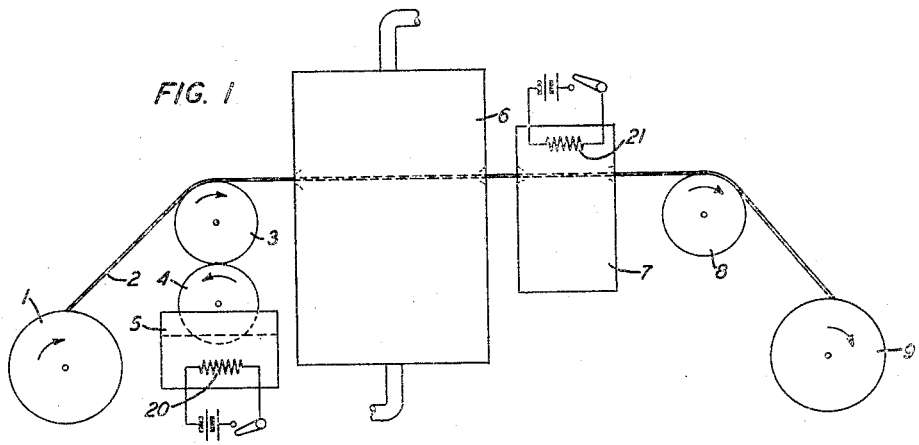
Fig. 1 illustrates equipment suitable for preparing metal stock for the welding operation.

Referring particularly to the drawing, Fig. 1 discloses a method of preparing for welding a supply of metal in the form of a tape or ribbon by passing it through a chamber containing an atmosphere of some suitable gas for producing a chemical reaction to deposit a layer of tarnish on the surface of the tape. A reel 1 shown at the left of the drawing contains a supply of flexible metal 2, which is assumed to be a thin ribbon of silver. The ribbon 2 is drawn in any suitable manner over a roller 3, which bears on a roller 4, which in turn is partly immersed in a bath 5 of some suitable substance, such as liquid wax. A heater 20 keeps the wax in a molten state. As the rollers 3 and 4 rotate, the liquid wax is transferred from the bath 5 to the surface of the roller 3 and forms a thin protective coating on the under side of the ribbon. The purpose of this wax coating will be explained hereinafter.

The ribbon 2 after passing over the roller 3 enters a chamber 6 containing an atmosphere suitable for producing a tarnish on the upper or unprotected surface of the ribbon. Any gas or other substance may be used which will combine chemically with the metallic silver to form a resultant compound on the surface of the ribbon having a relatively high electrical resistance. For example, if the chamber 6 contains an atmosphere of hydrogen sulphide and water vapor, a coating of silver sulphide is formed on the unprotected surface of the ribbon. Other gases that may be used are carbon dioxide and sulphur dioxide.

After the tape 2 emerges from the chamber 6, the protective coating of wax may be removed in any suitable manner. One way of accomplishing this is to pass the tape through a chamber 7 heated sufficiently by a heater 21 to melt and remove the wax from the tape. The tape then emerges from the chamber 7 and passes over an idler 8 to a storing reel 9. It is now ready for the welding operation.

Figure 2:
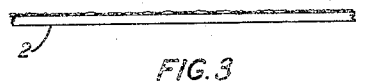
Fig. 2 illustrates a portion of welding stock after preparation.

Fig. 2 illustrates an enlargement of a portion of the tape 2 after its upper surface has been coated with a layer of tarnish resulting from the chemical reaction taking place within the chamber 6.

Figure 3:
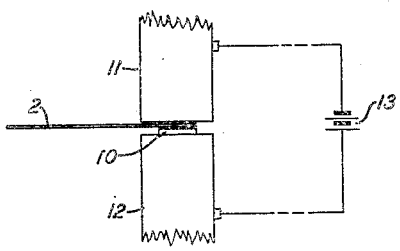
Fig. 3 is a schematic illustration of an electric welding device.

When the tape thus prepared is placed in contact with an object 10 (Fig. 3) of some metal, such as brass, and between the electrodes 11 and 12 of a welding machine, the resistance at the surface of contact between the ribbon 2 and the metal 10 is sufficient, because of the layer of artificial tarnish, to concentrate the heat caused by the flow of current from the source 13. This enables a weld to be performed in a minimum of time and with a minimum intensity of current and without injury to the objects being welded together.

It is of course within the scope of the invention to prepare the welding tape 2 in numerous other ways. If desirable, the protective coating of wax or other material may be omitted. In this case both sides of the tape are tarnished as it passes through the chamber 6. One side of the tape may then be cleaned of its coating of tarnish by abrasion or in any other suitable way.

Another method of producing a layer of resisting material on the surface of the welding stock is to pass the welding stock through a bath of some suitable liquid, such as an acid. If desirable the metallic stock may be coated with wax on one surface as above described before it enters the liquid.

What is claimed is:

1. The method of preparing sheet metal for welding which comprises covering one surface with a protective coating, and subjecting said sheet to a chemical reaction to produce on the other surface thereof a substance having a conductivity different from that of the metal itself.

2. The method of preparing sheet metal for welding which comprises covering one surface of the metal with a protective coating, and passing the metal through an atmosphere containing a gas that reacts chemically with the metal to produce on the unprotected surface thereof a layer of a substance having a different electrical conductivity than the metal itself.

3. The method of preparing for welding a thin ribbon of metal having a high electric conductivity which comprises depositing on one side thereof a coating of protective material by advancing said ribbon over a rotating element having a supply of said material adhering thereto, and advancing the coated ribbon into a reaction chamber containing a fluid that reacts on said metal to produce on the unprotected side of said ribbon a substance of suitable thickness and having a different conductivity from the metal itself.

4. The method of preparing for welding a thin ribbon of metal having a high electric conductivity which comprises depositing on one side thereof a coating of protective material by advancing said ribbon over a rotating element having a supply of said material adhering thereto, advancing the coated ribbon into a reaction chamber containing a fluid that reacts on said metal to produce on the unprotected side of said ribbon a substance of suitable thickness and having a different conductivity from the metal itself, and advancing the ribbon through a heating chamber to remove said protective material therefrom.

5. The method of preparing for welding a thin silver ribbon which comprises continuously advancing said ribbon from a supply reel over the surface of a roller having a supply of molten wax adhering thereto to deposit on one side of said ribbon a protective coating of said wax, advancing the wax-coated ribbon through a reaction chamber containing a gas that reacts on silver to produce on the unprotected side of said ribbon a coating of a silver compound of a desired thickness, advancing said ribbon through a heating chamber to melt and remove therefrom said coating of wax, and coiling the ribbon thus prepared on a supply reel for subsequent use as welding stock.

DAVID T. MAY.